(12) United States Patent
Enomoto

(10) Patent No.: US 7,538,954 B2
(45) Date of Patent: May 26, 2009

(54) ZOOM LENS SYSTEM

(75) Inventor: Takashi Enomoto, Chiba (JP)

(73) Assignee: Hoya Corporation, Tokyo (JP)

( * ) Notice: Subject to any disclaimer, the term of this patent is extended or adjusted under 35 U.S.C. 154(b) by 33 days.

(21) Appl. No.: 11/744,388

(22) Filed: May 4, 2007

(65) Prior Publication Data
US 2007/0263295 A1 Nov. 15, 2007

(30) Foreign Application Priority Data
May 10, 2006 (JP) .............................. 2006-131126

(51) Int. Cl.
*G02B 15/14* (2006.01)
(52) U.S. Cl. ...................... 359/689; 359/686
(58) Field of Classification Search ......... 359/680–682, 359/685, 689, 686, 695
See application file for complete search history.

(56) References Cited

U.S. PATENT DOCUMENTS

| | | | |
|---|---|---|---|
| 6,614,599 | B1 | 9/2003 | Watanabe |
| 6,781,768 | B2 * | 8/2004 | Minefuji ..................... 359/689 |
| 7,085,067 | B2 | 8/2006 | Enomoto |
| 7,227,695 | B2 | 6/2007 | Enomoto |
| 7,251,080 | B2 | 7/2007 | Enomoto |
| 2002/0051301 | A1 * | 5/2002 | Noguchi et al. ............. 359/689 |
| 2003/0123156 | A1 * | 7/2003 | Minefuji ..................... 359/682 |
| 2003/0138245 | A1 | 7/2003 | Watanabe |
| 2004/0095654 | A1 | 5/2004 | Watanabe |

FOREIGN PATENT DOCUMENTS

| | | |
|---|---|---|
| EP | 1096287 | 5/2001 |
| JP | 10-039214 | 2/1998 |
| JP | 2001-066503 | 3/2001 |
| JP | 2001-141997 | 5/2001 |
| JP | 2003-177316 | 6/2003 |

OTHER PUBLICATIONS

English language Abstract of JP 2001-066503.
English language Abstract of JP 2001-141997.
English language Abstract of JP 2003-177316.
English language Abstract of JP 10-039214.
English language Abstract of JP 2001-066503.
English language Abstract of JP 2001-141997.
English language Abstract of JP 2003-177316.

* cited by examiner

*Primary Examiner*—Ricky L Mack
*Assistant Examiner*—James R Greece
(74) *Attorney, Agent, or Firm*—Greenblum & Bernstein, P.L.C.

(57) ABSTRACT

A zoom lens system includes negative first lens group, a positive second lens group and a positive third lens group, in this order from the object. Upon zooming from the short focal length extremity to the long focal length extremity, all of the negative first lens group, the positive second lens group and the positive third lens groups are arranged to move in the optical axis direction. The negative first lens group includes a negative lens element, a negative lens element and a positive lens element, in this order from the object. The positive second lens group includes a positive lens element, a positive lens element, a negative lens element, and a positive lens element, in this order from the object.

The zoom lens system satisfies the following condition:

$$1.2 < |f_{1G}|/f_{2G} < 1.5$$

wherein
$f_{1G}$ designates the focal length of the negative first lens group ($f_{1G} < 0$); and
$f_{2G}$ designates the focal length of the positive second lens group.

10 Claims, 7 Drawing Sheets

Fig. 1
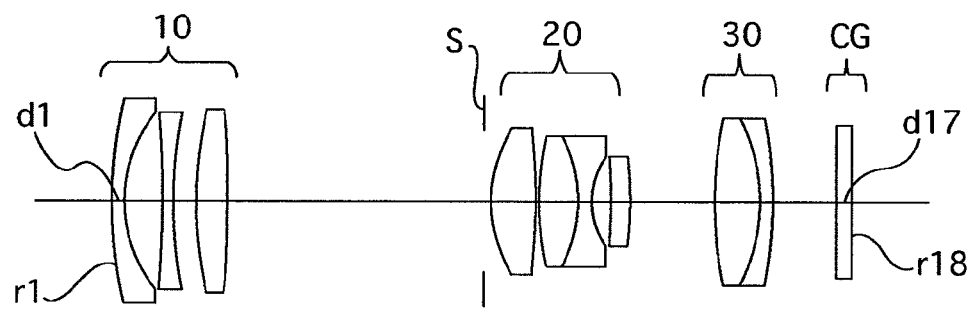
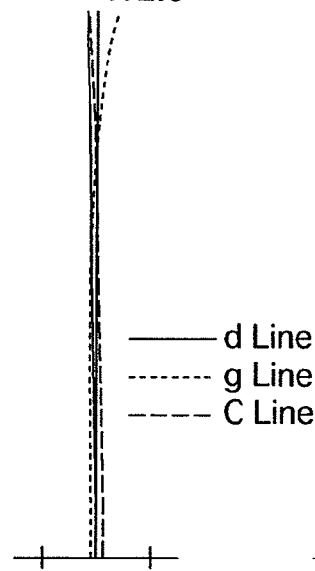
Fig. 2A
FNO.= 1:2.0
—— d Line
------ g Line
---- C Line
-0.2   0.2
SPHERICAL
ABERRATION
CHROMATIC
ABERRATION
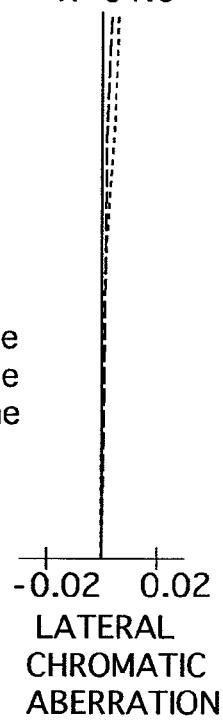
Fig. 2B
W=31.6°
-0.02   0.02
LATERAL
CHROMATIC
ABERRATION
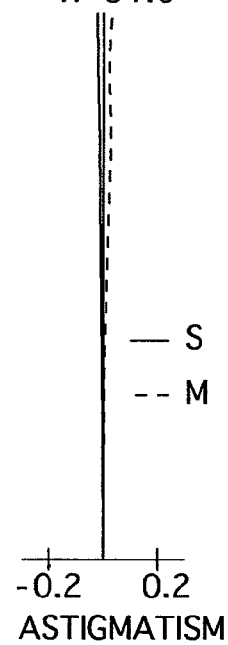
Fig. 2C
W=31.6°
—— S
-- M
-0.2   0.2
ASTIGMATISM
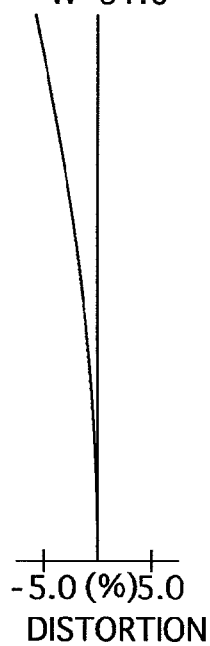
Fig. 2D
W=31.6°
-5.0 (%) 5.0
DISTORTION

FNO.= 1: 2.7

— d Line
----- g Line
---- C Line

-0.2  0.2
SPHERICAL
ABERRATION

CHROMATIC
ABERRATION

W=19.3°

-0.02  0.02
LATERAL
CHROMATIC
ABERRATION

W=19.3°

— S
-- M

-0.2  0.2
ASTIGMATISM

W=19.3°

-5.0(%)5.0
DISTORTION

FNO.= 1: 4.1

— d Line
----- g Line
---- C Line

-0.2  0.2
SPHERICAL
ABERRATION

CHROMATIC
ABERRATION

W=11.2°

-0.02  0.02
LATERAL
CHROMATIC
ABERRATION

W=11.2°

— S
-- M

-0.2  0.2
ASTIGMATISM

W=11.2°

-5.0(%)5.0
DISTORTION

Fig.5
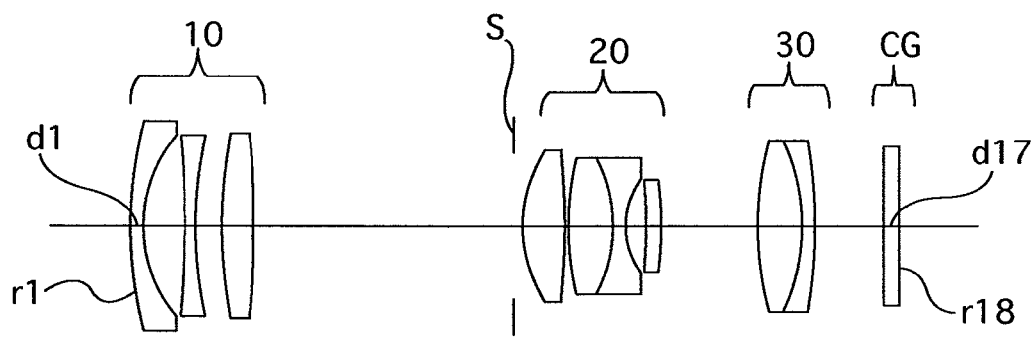
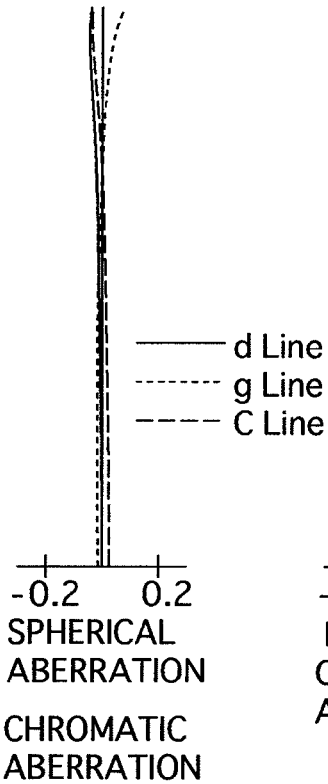
Fig. 6A
FNO.= 1: 2.0
—— d Line
---- g Line
– – – C Line
-0.2  0.2
SPHERICAL
ABERRATION
CHROMATIC
ABERRATION
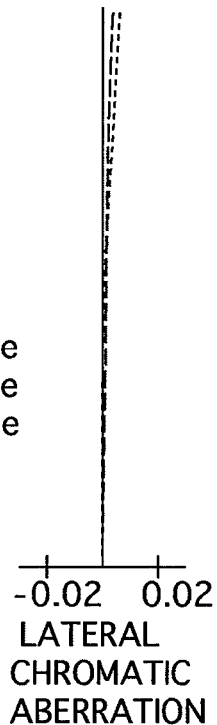
Fig. 6B
W=31.5°
-0.02  0.02
LATERAL
CHROMATIC
ABERRATION
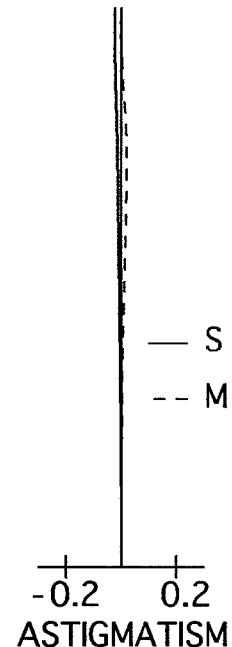
Fig. 6C
W=31.5°
— S
– – M
-0.2  0.2
ASTIGMATISM
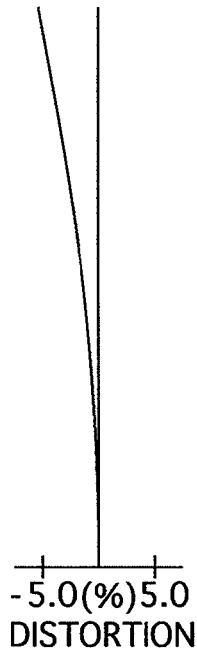
Fig. 6D
W=31.5°
-5.0(%)5.0
DISTORTION

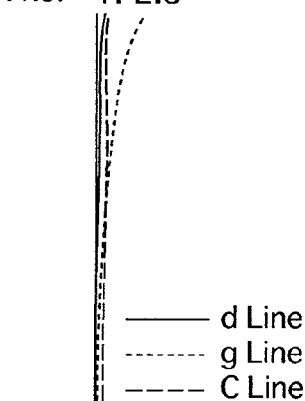
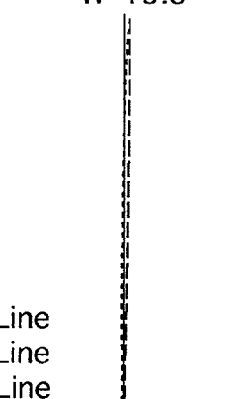
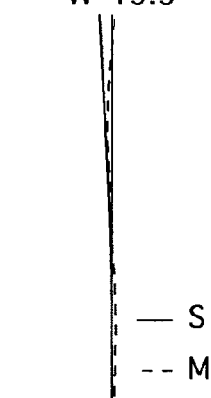
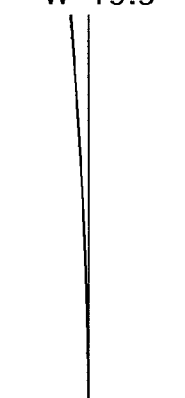
Fig. 7A  Fig. 7B  Fig. 7C  Fig. 7D
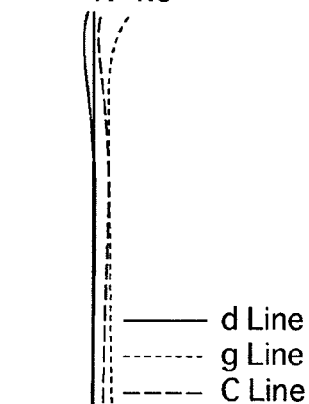
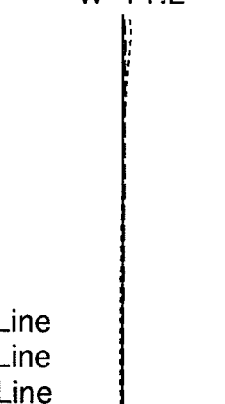
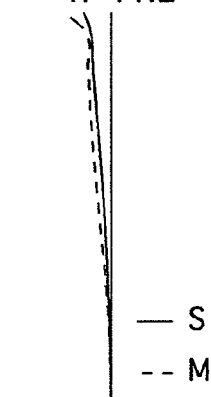
Fig. 8A  Fig. 8B  Fig. 8C  Fig. 8D

FNO.= 1: 2.0

—— d Line
------- g Line
---- C Line

-0.2   0.2
SPHERICAL
ABERRATION
CHROMATIC
ABERRATION

W=31.7°

-0.02   0.02
LATERAL
CHROMATIC
ABERRATION

W=31.7°

—— S
-- M

-0.2   0.2
ASTIGMATISM

W=31.7°

-5.0 (%) 5.0
DISTORTION

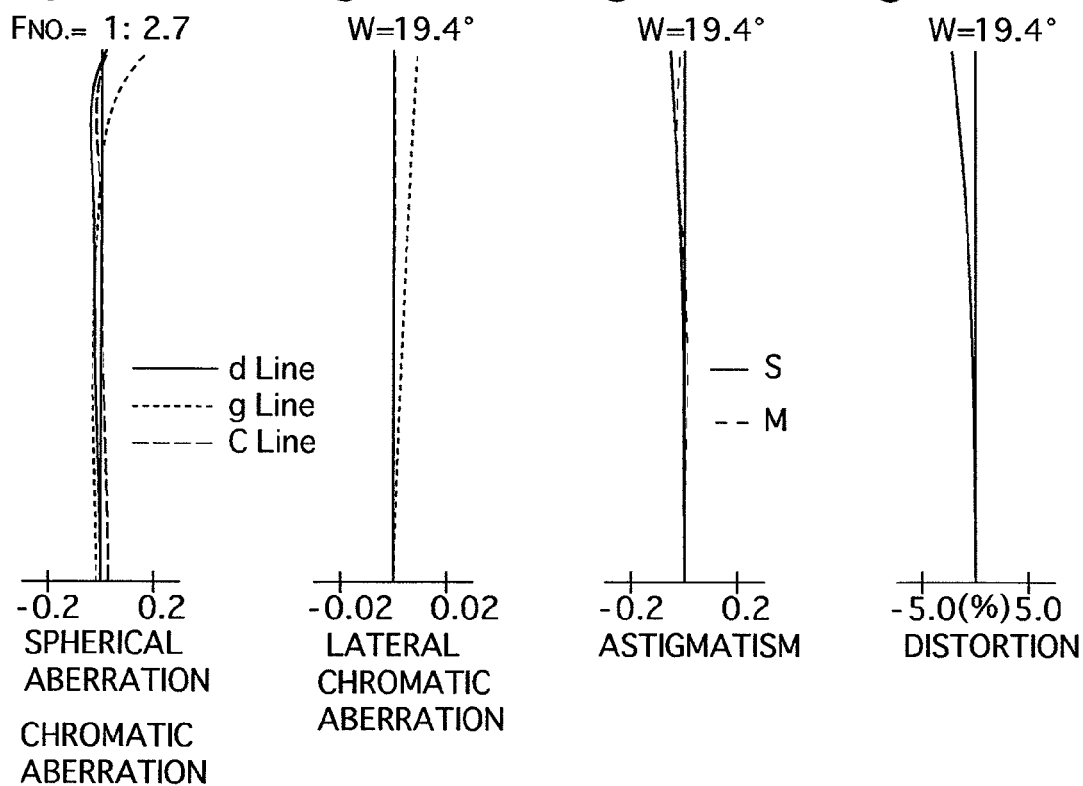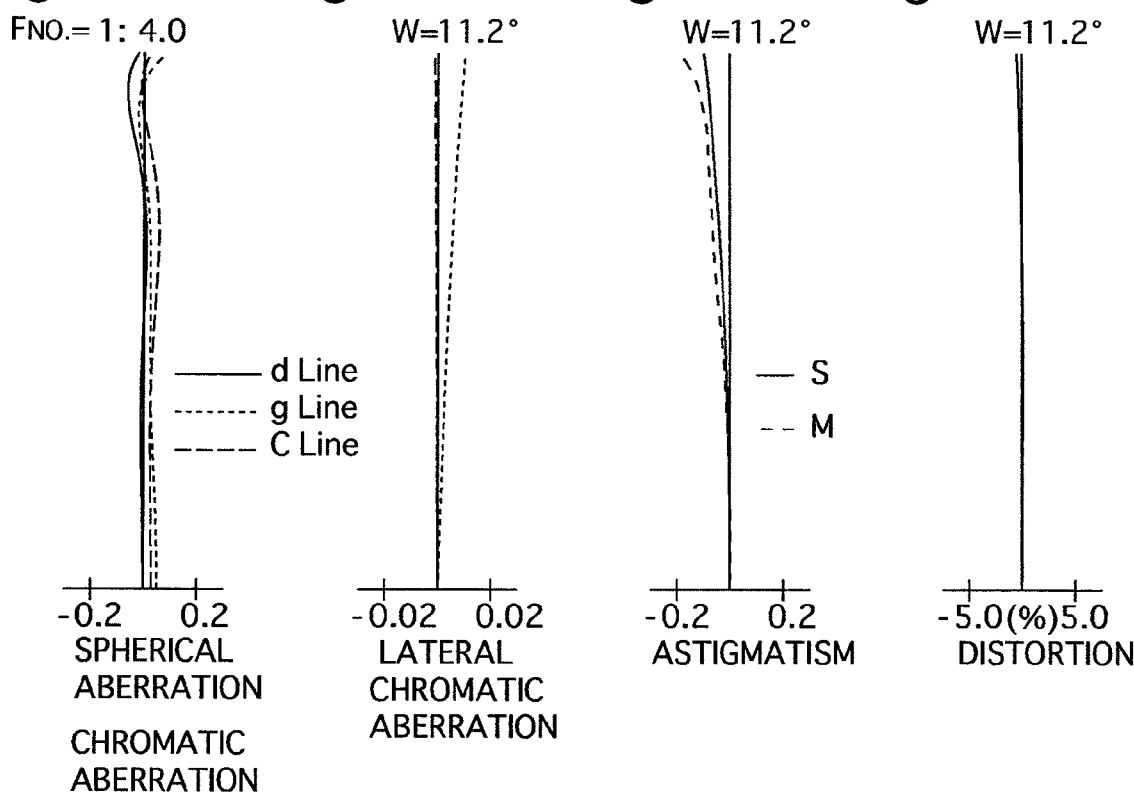

ZOOM LENS SYSTEM

BACKGROUND OF THE INVENTION

1. Field of the Invention

The present invention relates to a zoom lens system which has a zoom ratio of approximately 3 covering a wide-angle range to a telephoto range, and which is used in a digital camera having an imaging device such as a CCD or a CMOS.

2. Description of the Prior Art

In recent years, there has been a further demand for higher quality zoom lens systems in order to cope with higher pixelization of imaging devices, and also there has been a demand for faster lens systems having a smaller F-number in order to cope with pixel-miniaturization. However, in reality, zoom lens systems having an F-number in a range from 2.8 to 3.5 at the short focal length extremity are the most predominant in products in the market.

In a typical small zoom lens system used in a compact camera, if attempts are made to achieve a fast lens system having an F-number of approximately 2 at the short focal length extremity, the correcting of various aberrations, e.g., spherical aberration in particular, etc., becomes difficult.

The number of lens elements can, of course, be increased to the extent that these lens elements can constitute four or more lens groups; and thereby, the various aberrations can be corrected. On the other hand, miniaturization of the lens system is sacrificed.

SUMMARY OF THE INVENTION

The present invention is to provide a miniaturized, high quality zoom lens system of the three-lens-group arrangement, i.e., a lens group having a negative refractive power (hereinafter, a negative lens group), a lens group having a positive refractive power (hereinafter, a positive lens group), and a positive lens group, in this order from the object, in which (i) the lens arrangement in each lens group is appropriately determined, (ii) the F-number is smaller to the extent of approximately 2 at the short focal length extremity, and (iii) the zoom ratio is approximately 3.

According to an aspect of the present invention, there is provided a zoom lens system including a negative first lens group, a positive second lens group and a positive third lens group, in this order from the object.

Upon zooming from the short focal length extremity to the long focal length extremity, all of the negative first lens group, the positive second lens group and the positive third lens groups are arranged to move in the optical axis direction.

The negative first lens group includes a negative lens element, a negative lens element and a positive lens element, in this order from the object.

The positive second lens group includes a positive lens element, a positive lens element, a negative lens element, and a positive lens element, in this order from the object.

The zoom lens system satisfies the following condition:

$$1.2 < |f_{1G}|/f_{2G} < 1.5 \quad (1)$$

wherein $f_{1G}$ designates the focal length of the negative first lens group ($f_{1G} < 0$); and $f_{2G}$ designates the focal length of the positive second lens group.

According to another aspect of the present invention, there is provided a zoom lens system including a negative first lens group, a positive second lens group and a positive third lens group, in this order from the object.

Upon zooming from the short focal length extremity to the long focal length extremity, all of the negative first lens group, the positive second lens group and the positive third lens groups are arranged to move in the optical axis direction.

The negative first lens group includes a negative first lens element, a negative second lens element and a positive third lens element, in this order from the object.

The positive second lens group includes a positive fourth lens element, a positive fifth lens element, a negative sixth lens element, and a positive seventh lens element, in this order from the object.

The positive fifth lens element and the negative sixth lens element are cemented to each other, in this order from the object, and the combined refractive power of these lens elements is negative; and the positive fifth lens element and the negative sixth lens element and the positive second lens group satisfy the following condition:

$$0.8 < |f_{5-6}|/f_{2G} < 1.2 \quad (2)$$

wherein $f_{2G}$ designates the focal length of the positive second lens group; and $f_{5-6}$ designates the combined focal length of the positive fifth lens element and the negative sixth lens element which are cemented to each other.

According to a further aspect of the present invention, there is provided a zoom lens system including a negative first lens group, a positive second lens group and a positive third lens group, in this order from the object.

Upon zooming from the short focal length extremity to the long focal length extremity, all of the negative first lens group, the positive second lens group and the positive third lens groups are arranged to move in the optical axis direction.

The negative first lens group includes a negative first lens element, a negative second lens element and a positive third lens element, in this order from the object.

The positive second lens group includes a positive fourth lens element, a positive fifth lens element, a negative sixth lens element, and a positive seventh lens element, in this order from the object.

The positive fourth lens element of the positive second lens group satisfies the following condition:

$$-0.9 < (R_{4a}+R_{4b})/(R_{4a}-R_{4b}) < -0.5 \quad (3)$$

wherein $R_{4a}$ designates the radius of curvature of the object-side surface of the positive fourth lens element; and $R_{4b}$ designates the radius of curvature of the image-side surface of the positive fourth lens element.

In the above further aspect of the present invention, the combined refractive power of the positive fifth lens element and the negative sixth lens element of the positive second lens group is negative, and these lens elements can be cemented to each other.

According to a still further aspect of the present invention, there is provided a zoom lens system including a negative first lens group, a positive second lens group and a positive third lens group, in this order from the object.

Upon zooming from the short focal length extremity to the long focal length extremity, all of the negative first lens group, the positive second lens group and the positive third lens groups are arranged to move in the optical axis direction.

The negative first lens group includes a negative lens element, a negative lens element and a positive lens element, in this order from the object.

The positive second lens group includes a positive lens element, a positive lens element, a negative lens element, and a positive lens element, in this order from the object.

The zoom lens system satisfies the following condition:

$$0.3 < f_{2G}/f_{3G} < 0.9 \quad (4)$$

wherein $f_{2G}$ designates the focal length of the positive second lens group; and $f_{3G}$ designates the focal length of the positive third lens group.

In any of the above aspects of the present invention, the positive third lens group is preferably constituted by a positive lens element only, or, by cemented lens elements having a positive lens element and a negative lens element.

The present disclosure relates to subject matter contained in Japanese Patent Application No. 2006-131126 (filed on May 10, 2006) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the zoom lens system, according to a first embodiment of the present invention;

FIGS. 2A, 2B, 2C and 2D show aberrations occurred, at the short focal length extremity, in the lens arrangement shown in FIG. 1;

FIG. 5 is a lens arrangement of the zoom lens system, according to a second embodiment of the present invention;

FIGS. 6A, 6B, 6C and 6D show aberrations occurred, at the short focal length extremity, in the lens arrangement shown in FIG. 5;

FIGS. 7A, 7B, 7C and 7D show aberrations occurred, at an intermediate focal length, in the lens arrangement shown in FIG. 5;

FIGS. 8A, 8B, 8C and 8D show aberrations occurred, at the long focal length extremity, in the lens arrangement shown in FIG. 5;

FIGS. 11A, 11B, 11C and 11D show aberrations occurred, at an intermediate focal length, in the lens arrangement shown in FIG. 9;

FIGS. 12A, 12B, 12C and 12D show aberrations occurred, at the long focal length extremity, in the lens arrangement shown in FIG. 9.

DESCRIPTION OF THE PREFERRED EMBODIMENTS

Figure 13:
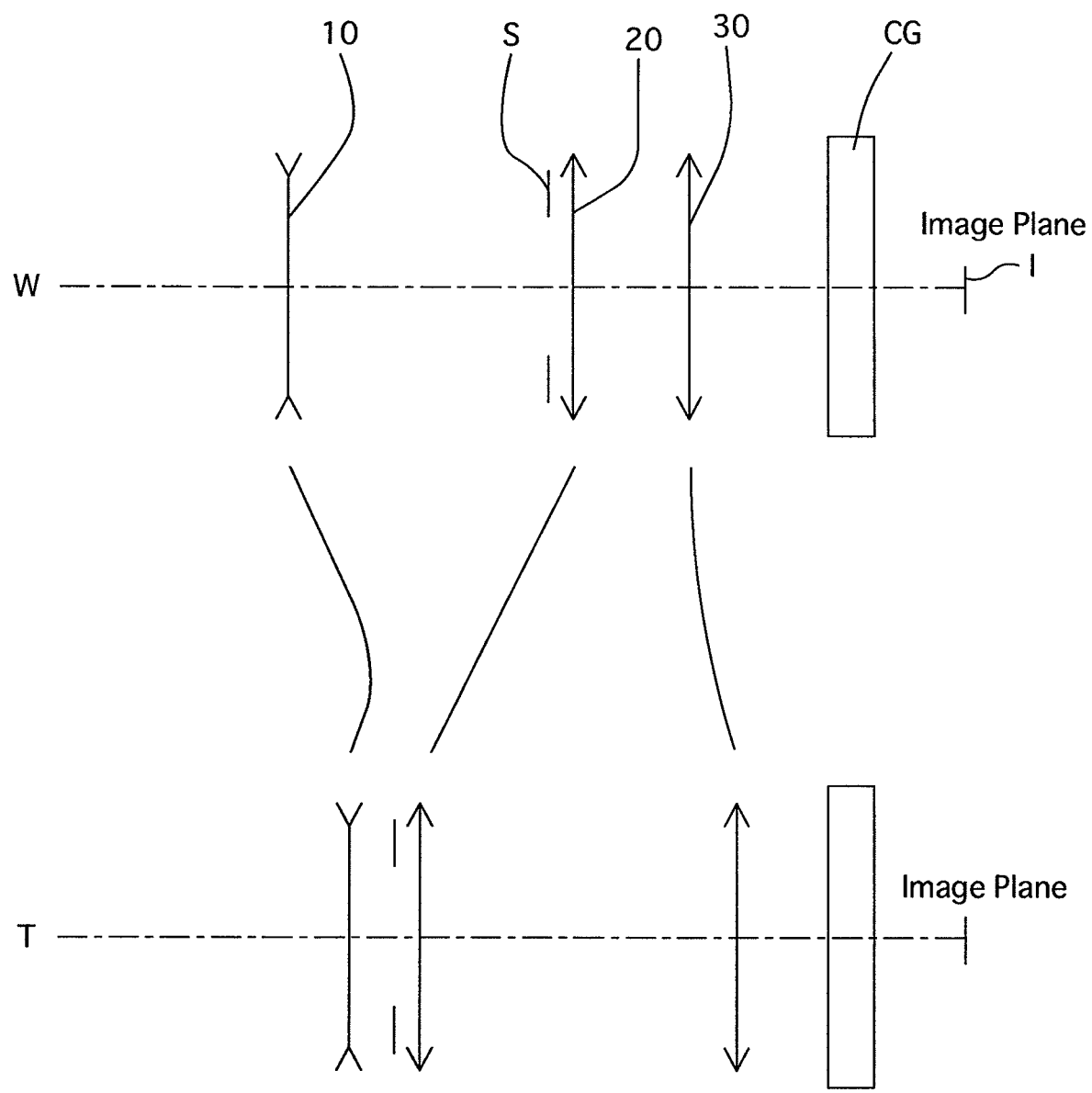
FIG. 13 is the schematic view of the lens-group moving paths for the zoom lens system according to the present invention.

The zoom lens system of the present invention, as shown in the lens-group-moving paths of FIG. 13, includes a negative first lens group 10, a diaphragm S, a positive second lens group 20, a positive third lens group 30, and a cover glass (filter group) CG provided in front of an imaging device, in this order from the object. "I" designates the image plane.

Upon zooming from the short focal length extremity (W) to the long focal length extremity (T), all of the negative first lens group 10, the positive second lens group 20 and the positive third lens group 30 move in the optical axis direction.

More specifically, the negative first lens group 10 first moves toward the image and thereafter moves toward the object; the positive second lens group 20 moves towards the object; and the positive third lens group 30 moves toward the image.

The diaphragm S moves together with the positive second lens group 20. On the other hand, the diaphragm S can be provided between the positive second lens group 20 and the positive third lens group 30, and can be arranged to move together with the positive second lens group 20.

Focusing is performed by the positive third lens group 30.

Figure 3A:
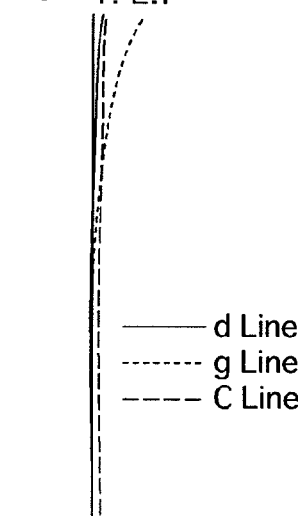
FIGS. 3A, 3B, 3C and 3D show aberrations occurred, at an intermediate focal length, in the lens arrangement shown in FIG. 1.
Figure 3B:
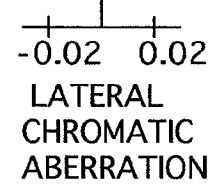
Figure 3C:
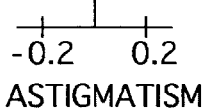
Figure 3D:
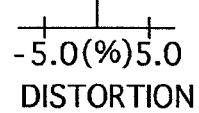
Figure 4A:
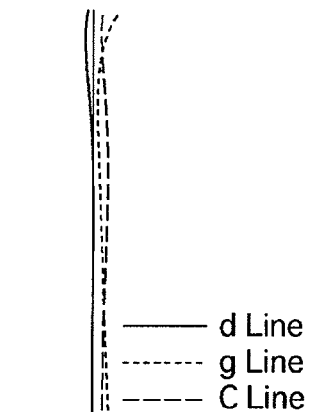
FIGS. 4A, 4B, 4C and 4D show aberrations occurred, at the long focal length extremity, in the lens arrangement shown in FIG. 1.
Figure 4B:
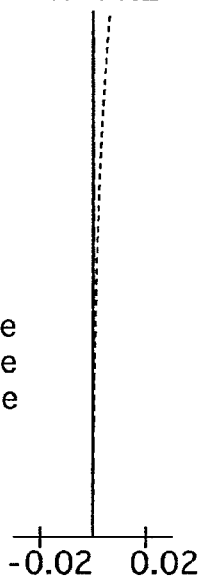
Figure 4C:
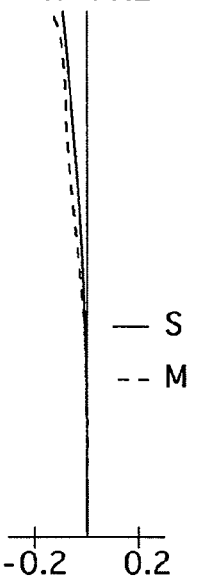
Figure 4D:
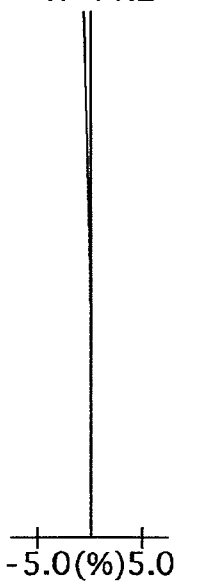
Figure 9:
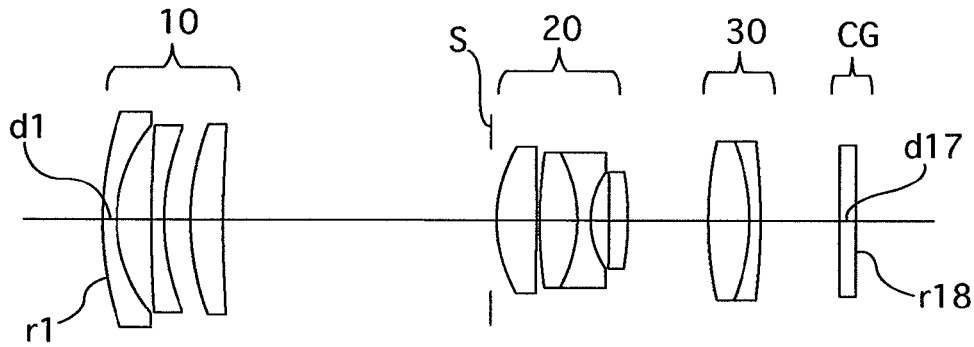
FIG. 9 is a lens arrangement of the zoom lens system, according to a third embodiment of the present invention.
Figure 10A:
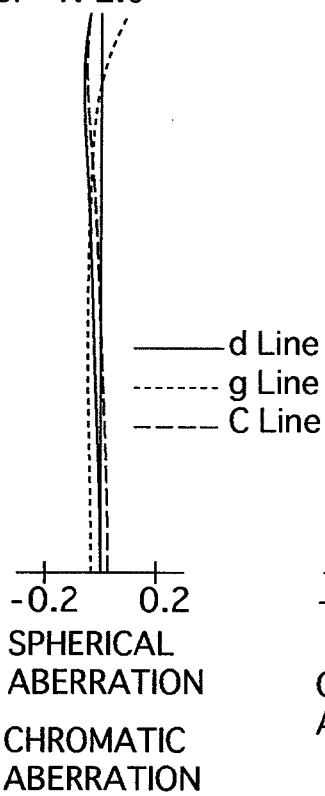
FIGS. 10A, 10B, 10C and 10D show aberrations occurred, at the short focal length extremity, in the lens arrangement shown in FIG. 9.
Figure 10B:
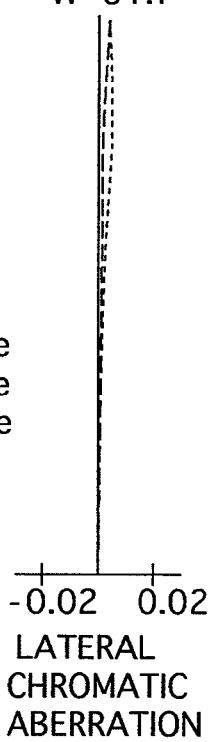
Figure 10C:
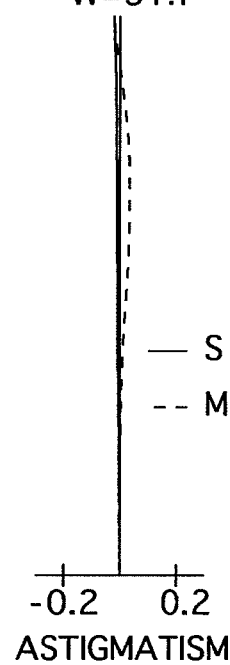
Figure 10D:
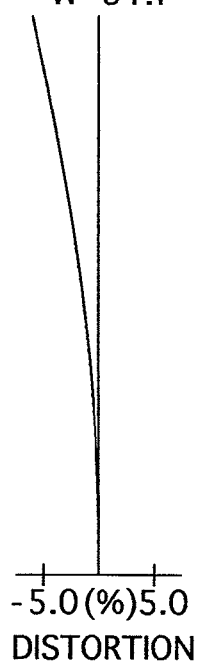

In the zoom lens system of the present invention, each of the negative first lens group 10, the positive second lens group 20 and the positive third lens group 30 have the following lens arrangements, as shown in FIGS. 1, 5, and 9:

The negative first lens group 10 includes a negative first lens element, a negative second lens element and a positive third lens element, in this order from the object;

The positive second lens group 20 includes a positive fourth lens element, a positive fifth lens element, a negative sixth lens element, and a positive seventh lens element, in this order from the object; and The positive third lens group 30 includes a positive eighth lens element and a negative ninth lens element, which are cemented to each other, in this order from the object.

In all embodiments to be discussed in detail, the positive fifth lens element and the negative sixth lens element of the positive second lens group 20 are cemented to each other; however, the positive fifth lens element and the negative sixth lens element can be provided as separate individual lens elements; and the positive third lens group 30 can be constituted by a positive single lens element only.

In a conventional zoom lens system having a zoom ratio of approximately 3 and an F-number in the range of 2.8 to 3.5, even the negative first lens group of the two lens-element arrangement can collect a bundle of axial light-rays, and adequately correct spherical aberration and distortion.

On the other hand, in the zoom lens system of the present invention having a faster F-number of approximately 2 at the short focal length extremity, the diameter of an axial light-rays collected by the negative first lens group 10 becomes larger; and moreover, in the case of the negative first lens group 10 with the two lens-element arrangement, i.e., the negative lens element and the positive lens element in this order from the object, incident light rays are sharply deflected by the single negative lens element only. As a result, spherical aberration inevitably occurs. In addition, since the negative lens element is designed to have full of diverging function, distortion in the negative direction at the short focal length extremity becomes larger.

On the other hand, if an attempt is made to reduce the full of diverging function on the negative lens element by increasing the distance between the negative lens element and the positive lens element, the distance sensitivity of spherical aberration becomes undesirably higher.

In the present invention, the negative first lens group 10 is constituted by a negative lens element, a negative lens element, and a positive lens element, in this order from the object, so that the negative refractive power is distributed over the two negative lens elements. Due to this arrangement, the correcting of spherical aberration and distortion is possible, while a bundle of axial light-rays is being collected.

With respect regard to the positive second lens group 20, in a conventional positive second lens group, spherical aberration largely occurs in the most object-side positive lens element. In this regard, in a conventional zoom lens system having the F-number of 2.8 to 3.5 at the short focal length extremity, spherical aberration can be corrected by the triplet type arrangement of the positive second lens group, i.e., "a positive lens element, a negative lens element and a positive lens element", or, "a positive lens element, a positive lens element and a negative lens element".

On the other hand, in the positive second lens group 20 of the present invention having the F-number of approximately 2 at the short focal length extremity, the correcting of spherical aberration by the three-lens-element arrangement thereof is not possible.

Then, the positive second lens group 20 is constituted by a positive lens element, a positive lens element, a negative lens element and a positive lens element, in this order from the object so that spherical aberration in particular can be corrected.

Furthermore, the correcting of spherical aberration can more suitably be made by cementing by positive lens element and the negative lens element between the most object-side positive lens element and the most image-side positive lens element.

In regard to the positive third lens group 30, it is preferable that a single and light (not heavy) positive lens element or cemented lens elements (a positive combined refractive power) having a positive lens element and a negative lens element constitute the positive third lens group 30 since the positive third lens group 30 functions as a focusing lens group (a rear-focusing system).

A rear-focusing system is more advantageous than a front-focusing system (by the negative first lens group 10) because of the following reasons: (i) the lens diameter and weight can be reduced, and (ii) the mechanism of the focusing lens group (the positive third lens group 30) can be simplified.

From an aspect of aberrations, in a zoom lens system, like that of the present invention, having the F-number of approximately 2 at the short focal length extremity, it is more preferable to constitute the positive third lens group 30 by cemented lens elements having a positive lens element and a negative lens element than by a single positive lens element, for the purpose of reducing the change in aberrations (particularly, field curvature and lateral chromatic aberration) when an object at a closer distance is being set to be in an in-focus state in a finite-distance photographing.

The zoom lens system of the present invention has the above-described arrangement, and preferably satisfies the following conditions (1) through (4).

Condition (1) specifies the ratio of the focal length of the negative first lens group 10 to that of the positive second lens group 20, i.e., the ratio of the refractive power of the negative first lens group 10 to that of the positive second lens group 20. By satisfying condition (1), (i) the traveling distance of the positive second lens group 20 upon zooming can be made shorter, so that further miniaturization of the zoom lens system can be achieved; and (ii) the correcting of aberrations (i.e., spherical aberration, coma and distortion) can be made suitably.

If the refractive power of the positive second lens group 20 becomes stronger to the extent that $|f_{1G}|/f_{2G}$ exceeds the upper limit of condition (1), the traveling distance of the positive second lens group 20 upon zooming becomes shorter; however, the correcting of spherical aberration and coma becomes difficult.

If the refractive power of the negative first lens group 10 becomes stronger to the extent that $|f_{1G}|/f_{2G}$ exceeds the lower limit of condition (1), negative divergence becomes too strong. Consequently, the correcting of distortion becomes difficult.

Condition (2) concerns the combined focal length of cemented lens elements (a negative refractive power) having the positive lens element and the negative lens element between the most object-side lens element and the most image-side lens element of the positive second lens group 20. By satisfying condition (2), (i) the traveling distance of the positive second lens group 20 upon zooming can be made shorter, so that further miniaturization of the zoom lens system can be attained; and (ii) the correcting of, particularly, spherical aberration can be made suitably.

If the combined refractive power of the cemented lens elements becomes weaker to the extent that $|f_{5-6}|/f_{2G}$ exceeds the upper limit of condition (2), negative divergence of the positive second lens group 20 for correcting aberrations becomes weaker. Consequently, spherical aberration is undercorrected.

If the combined refractive power of the cemented lens elements becomes stronger to the extent that $|f_{5-6}|/f_{2G}$ exceeds the lower limit of condition (2), negative divergence becomes too strong. Consequently, spherical aberration is overcorrected.

Condition (3) specifies the shape factor of the most object-side positive lens element of the positive second lens group 20. In the positive second lens group 20, spherical aberration generally occurs in the most object-side positive lens element. For reducing such a spherical aberration, the most object-side positive lens element preferably satisfies condition (3).

If $(R_{4a}+R_{4b})/(R_{4a}-R_{4b})$ exceeds either the upper limit of condition (3) or the lower limit thereof, it becomes difficult to sufficiently correct spherical aberration occurred in the positive second lens group 20.

Condition (4) specifies the ratio of the focal length of the positive second lens group 20 to that of the positive third lens group 30, i.e., the ratio of the refractive power of the positive second lens group 20 to that of the positive second lens group 30.

By satisfying condition (4), (i) the traveling distance of the positive second lens group 20 upon zooming can be made shorter, so that further miniaturization of the zoom lens system can be achieved; and (ii) the correcting of aberrations (i.e., spherical aberration and field curvature) can be made suitably.

If the refractive power of the positive second lens group 20 becomes weaker to the extent that $f_{2G}/f_{3G}$ exceeds the upper limit of condition (4), the traveling distance of the positive second lens group 20 upon zooming becomes longer. Consequently, the entire length of the zoom lens system becomes longer. Here, if an attempt is made to miniaturize the zoom lens system without considering the balance of refractive power over the positive second lens group 20 and the positive third lens group 30, the correcting of, in particular, spherical aberration and field curvature becomes difficult.

If the refractive power of the positive third lens group 30 becomes weaker to the extent that $f_{2G}/f_{3G}$ exceeds the lower limit of condition (4), the exit pupil approaches the image plane. Consequently, telecentricity becomes worsens. Moreover, the refractive power of the positive second lens group 20 becomes relatively too strong, so that spherical aberration largely occurs.

Specific numerical data of the embodiments will be described hereinafter.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

In the tables, FNO. designates the F-number, f designates the focal length of the entire zoom lens system, W designates the half angle-of-view (°), fB designates the back focal distance, r designates the radius of curvature, d designates the lens-element thickness or a distance between lens elements (lens groups) which is variable upon zooming, $N_d$ designates the refractive index of the d-line, and v designates the Abbe number. The values for the distance "d" are indicated in the order of the short focal length extremity, an intermediate focal length and the long focal length extremity.

In addition to the above, an aspherical surface which is symmetrical with respect to the optical axis is defined as follows:

$$x=cy^2/[1+\{1-(1+K)c^2y^2\}^{1/2}]+A4y^4+A6y^6+A8y^8+A10y^{10}\ldots$$

wherein:
c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Embodiment 1

FIG. 1 is the lens arrangement of the zoom lens system, according to a first embodiment of the present invention.

FIGS. 2A through 2D show aberrations occurred, at the short focal length extremity, in the lens arrangement shown in FIG. 1.

FIGS. 3A through 3D show aberrations occurred, at an intermediate focal length, in the lens arrangement shown in FIG. 1.

FIGS. 4A through 4D show aberrations occurred, at the long focal length extremity, in the lens arrangement shown in FIG. 1.

Table 1 shows the numerical values of the first embodiment.

The negative first lens group 10 includes a negative meniscus lens element having the convex surface facing toward the object, a negative biconcave lens element and a positive biconvex lens element, in this order from the object.

The positive second lens group 20 includes a positive biconvex lens element, cemented lens elements having a positive biconvex lens element and a negative biconcave lens element, and a positive meniscus lens element having the convex surface facing toward the image, in this order from the object.

The positive third lens group 30 includes cemented lens elements having a positive biconvex lens element and a negative meniscus lens element having the convex surface facing toward the image, in this order from the object.

The cover glass CG is a plane-parallel plate.

The diaphragm S is provided 0.50 in front of (on the object side of) the second lens group 20 (surface No. 7).

TABLE 1

FNO. = 1:2.0-2.7-4.1
f = 8.00-13.50-23.60
W = 31.6-19.3-11.2

| Surf. No. | r | d | Nd | v |
|---|---|---|---|---|
| 1 | 28.702 | 0.80 | 1.88300 | 40.8 |
| 2 | 9.106 | 2.48 | | |
| 3 | −70.872 | 0.70 | 1.74528 | 35.7 |
| 4 | 29.440 | 1.48 | | |
| 5* | 24.200 | 2.03 | 1.84666 | 23.8 |
| 6* | −147.188 | 16.99-7.11-1.00 | | |
| 7* | 8.362 | 2.91 | 1.69350 | 53.2 |
| 8* | −34.814 | 0.20 | | |
| 9 | 19.036 | 2.53 | 1.83399 | 43.1 |
| 10 | −9.066 | 0.89 | 1.70632 | 30.7 |
| 11 | 5.070 | 1.23 | | |
| 12 | −39.061 | 1.26 | 1.48749 | 70.2 |
| 13 | −23.988 | 5.47-11.69-22.14 | | |
| 14* | 27.246 | 2.91 | 1.69350 | 53.2 |
| 15 | −12.000 | 0.80 | 1.75000 | 27.7 |
| 16 | −29.279 | 4.13-3.58-2.50 | | |
| 17 | ∞ | 1.00 | 1.51633 | 64.1 |
| 18 | ∞ | | | |

The symbol * designates the aspherical surface which is rotationally symmetrical with respect to the optical axis.
Aspherical surface data (the aspherical surface coefficients not indicated are zero (0.00)):
Surf. No.

No. 5: K = − 0.79125; A4 = 0.34631 × 10$^{-5}$; A6 = − 0.16126 × 10$^{-5}$
A8 = 0.12020 × 10$^{-8}$; A10 = 0.22694 × 10$^{-10}$;
A12 = − 0.47834 × 10$^{-13}$

No. 6: K = − 0.77110 × 10$^{-2}$; A4 = − 0.44893 × 10$^{-4}$;
A6 = − 0.16638 × 10$^{-5}$
A8 = 0.16028 × 10$^{-8}$; A10 = 0.99681 × 10$^{-10}$;
A12 = − 0.24372 × 10$^{-11}$

No. 7: K = − 0.40338 × 10$^{-2}$; A4 = − 0.22635 × 10$^{-3}$;
A6 = − 0.23401 × 10$^{-5}$
A8 = − 0.41674 × 10$^{-8}$; A10 = − 0.10018 × 10$^{-8}$;
A12 = 0.23103 × 10$^{-11}$

No. 8: K= − 0.45211 × 10; A4 = 0.14036 × 10$^{-3}$;
A6= − 0.68324 × 10$^{-6}$
A8 = − 0.17698 × 10$^{-7}$; A10 = 0.19191 × 10$^{-9}$;
A12 = 0.70192 × 10$^{-11}$

No. 14: K = 0.36241; A4 = − 0.44445 × 10$^{-4}$; A6 = 0.47204 × 10$^{-5}$
A8 = − 0.19402 × 10$^{-6}$; A10 = 0.25675 × 10$^{-8}$;
A12 = 0.72769 × 10$^{-11}$

Embodiment 2

FIG. 5 is the lens arrangement of the zoom lens system, according to a second embodiment of the present invention.

FIGS. 6A through 6D show aberrations occurred, at the short focal length extremity, in the lens arrangement shown in FIG. 5.

FIGS. 7A through 7D show aberrations occurred, at an intermediate focal length, in the lens arrangement shown in FIG. 5.

FIGS. 8A through 8D show aberrations occurred, at the long focal length extremity, in the lens arrangement shown in FIG. 5.

Table 2 shows the numerical values of the second embodiment.

The basic lens arrangement of the second embodiment is the same as that of the first embodiment.

The diaphragm S is provided 0.60 in front of (on the object side of) the second lens group 20 (surface No. 7).

TABLE 2

FNO. = 1:2.0-2.8-4.3
f = 8.00-13.50-23.59
W = 31.5-19.3-11.2

| Surf. No. | r | d | Nd | ν |
|---|---|---|---|---|
| 1 | 26.640 | 0.80 | 1.88300 | 40.8 |
| 2 | 8.915 | 2.61 | | |
| 3 | −59.657 | 0.70 | 1.60000 | 40.0 |
| 4 | 26.937 | 1.65 | | |
| 5* | 27.999 | 2.00 | 1.84666 | 23.8 |
| 6* | −120.664 | 17.06-7.70-1.84 | | |
| 7* | 8.365 | 2.59 | 1.69350 | 53.2 |
| 8* | −37.848 | 0.20 | | |
| 9 | 19.141 | 2.80 | 1.83395 | 42.9 |
| 10 | −9.273 | 0.80 | 1.71437 | 30.4 |
| 11 | 5.109 | 1.27 | | |
| 12 | −27.718 | 1.00 | 1.49700 | 81.6 |
| 13 | −21.363 | 6.11-13.22-24.59 | | |
| 14* | 20.942 | 2.86 | 1.69350 | 53.2 |
| 15 | −12.500 | 0.80 | 1.72685 | 28.6 |
| 16 | −31.832 | 4.36-3.68-2.50 | | |
| 17 | ∞ | 1.00 | 1.51633 | 64.1 |
| 18 | ∞ | | | |

The symbol * designates the aspherical surface which is rotationally symmetrical with respect to the optical axis.
Aspherical surface data (the aspherical surface coefficients not indicated are zero (0.00)):
Surf. No.

No. 5: $K = -0.62419; A4 = 0.54380 \times 10^{-5}; A6 = -1.17107 \times 10^{-5}$
$A8 = -0.34752 \times 10^{-8};$
$A10 = 0.93749 \times 10^{-10}; A12 = 0.69140 \times 10^{-12}$ No. 6: $K = 0.20781 \times 10^{3}; A4 = -0.38333 \times 10^{-4};$
$A6 = -0.16720 \times 10^{-5}$
$A8 = 0.11525 \times 10^{-8}; A10 = 0.28262 \times 10^{-10};$
$A12 = 0.13136 \times 10^{-12}$ No. 7: $K = -0.36672 \times 10^{-2}; A4 = -0.22292 \times 10^{-3};$
$A6 = -0.23109 \times 10^{-5}$
$A8 = -0.59768 \times 10^{-8}; A10 = -0.10044 \times 10^{-8};$
$A12 = 0.36311 \times 10^{-12}$ No. 8: $K = 0.33347 \times 10; A4 = 0.13488 \times 10^{-3};$
$A6 = -0.71728 \times 10^{-6}$
$A8 = -0.19279 \times 10^{-7}; A10 = 0.19783 \times 10^{-9};$
$A12 = 0.51855 \times 10^{-11}$ No. 14: $K = 0.14241 \times 10; A4 = -0.44839 \times 10^{-4};$
$A6 = 0.41430 \times 10^{-5}$
$A8 = -0.17930 \times 10^{-6}; A10 = 0.31405 \times 10^{-8};$
$A12 = -0.15429 \times 10^{-10}$ Embodiment 3

FIG. 9 is the lens arrangement of the zoom lens system, according to a third embodiment of the present invention.

FIGS. 10A through 10D show aberrations occurred, at the short focal length extremity, in the lens arrangement shown in FIG. 9.

FIGS. 11A through 11D show aberrations occurred, at an intermediate focal length, in the lens arrangement shown in FIG. 9.

FIGS. 12A through 12D show aberrations occurred, at the long focal length extremity, in the lens arrangement shown in FIG. 9.

Table 3 shows the numerical values of the third embodiment.

The basic lens arrangement of the third embodiment is the same as that of the first embodiment.

The diaphragm S is provided 0.40 in front of (on the object side of) the second lens group 20 (surface No. 7).

TABLE 3

FNO. = 1:2.0-2.7-4.0
f = 8.00-13.50-23.60
W = 31.7-19.4-11.2

| Surf. No. | r | d | Nd | ν |
|---|---|---|---|---|
| 1 | 21.071 | 0.90 | 1.88300 | 40.8 |
| 2 | 9.175 | 2.21 | | |
| 3 | 99.207 | 0.80 | 1.75148 | 37.4 |
| 4 | 15.036 | 1.64 | | |
| 5* | 16.442 | 2.01 | 1.84666 | 23.8 |
| 6* | 59.060 | 17.31-6.86-1.02 | | |
| 7* | 8.502 | 2.53 | 1.77250 | 49.6 |
| 8* | −104.529 | 0.20 | | |
| 9 | 30.853 | 2.43 | 1.84940 | 43.4 |
| 10 | −8.809 | 0.84 | 1.66073 | 31.2 |
| 11 | 5.468 | 1.14 | | |
| 12 | −142.212 | 1.21 | 1.48700 | 71.5 |
| 13 | −18.745 | 4.96-10.51-21.67 | | |
| 14* | 25.747 | 2.60 | 1.58913 | 61.2 |
| 15 | −13.160 | 0.70 | 1.72511 | 28.7 |
| 16 | −41.848 | 5.01-4.66-2.00 | | |
| 17 | ∞ | 1.00 | 1.51633 | 64.1 |
| 18 | ∞ | | | |

The symbol * designates the aspherical surface which is rotationally symmetrical with respect to the optical axis.
Aspherical surface data (the aspherical surface coefficients not indicated are zero (0.00)):
Surf. No.

No. 5: $K = -0.31892; A4 = -0.86152 \times 10^{-5}; A6 = -0.17048 \times 10^{-5}$
$A8 = 0.24906 \times 10^{-7}; A10 = 0.70283 \times 10^{-11};$
$A12 = 0.36549 \times 10^{-11}$ No. 6: $K = 0.25480 \times 10^{2}; A4 = -0.78648 \times 10^{-4};$
$A6 = -0.14196 \times 10^{-5}$
$A8 = 0.55041 \times 10^{-8}; A10 = 0.58774 \times 10^{-9};$
$A12 = -0.31411 \times 10^{-11}$ No. 7: $K = 0.87963 \times 10^{-1}; A4 = -0.17294 \times 10^{-3};$
$A6 = -0.25771 \times 10^{-5}$
$A8 = 0.24522 \times 10^{-8}; A10 = -0.24805 \times 10^{-8};$
$A12 = -0.85975 \times 10^{-10}$ No. 8: $K = 0.11349 \times 10^{2} A4 = 0.19940 \times 10^{-3} A6 = -0.68541 \times 10^{-7}$
$A8 = -0.76962 \times 10^{-7}; A10 = -0.11793 \times 10^{-8};$
$A12 = -0.38424 \times 10^{-10}$ No. 14: $K = 0.90834 \times 10; A4 = -0.91048 \times 10^{-4};$
$A6 = 0.91774 \times 10^{-5}$
$A8 = -0.47978 \times 10^{-6}; A10 = 0.93997 \times 10^{-8};$
$A12 = -0.15408 \times 10^{-10}$ The numerical values of each condition for each embodiment are shown in Table 4.

TABLE 4

| | Embod. 1 | Embod. 2 | Embod. 3 |
|---|---|---|---|
| Condition (1) | 1.32 | 1.27 | 1.35 |
| Condition (2) | 0.99 | 0.92 | 1.09 |
| Condition (3) | −0.613 | −0.638 | −0.850 |
| Condition (4) | 0.66 | 0.79 | 0.41 |

As can be understood from Table 4, the first through third embodiments satisfy conditions (1) through (4). Furthermore, as can be understood from the aberration diagrams, the various aberrations are adequately corrected.

According to the above description, a miniaturized, high quality zoom lens system of the three-lens-group arrangement, i.e., a negative lens group, a positive lens group, and a positive lens group, in this order from the object, with the following features can be achieved: (i) the F-number is smaller to the extent of approximately 2 at the short focal length extremity, and (ii) the zoom ratio is approximately 3.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprises a negative first lens group, a positive second lens group and a positive third lens group, in this order from an object, wherein upon zooming from the short focal length extremity to the long focal length extremity, all of said negative first lens group, said positive second lens group and said positive third lens groups are arranged to move in the optical axis direction;

wherein said negative first lens group comprises a negative lens element, a negative lens element and a positive lens element, in this order from the object;

wherein said positive second lens group comprises a positive lens element, a positive lens element, a negative lens element, and a positive lens element, in this order from the object; and wherein said zoom lens system satisfies the following condition:

$$1.2<|f_{1G}|/f_{2G}<1.5$$

wherein $f_{1G}$ designates the focal length of said negative first lens group ($f_{1G}<0$); and $f_{2G}$ designates the focal length of said positive second lens group.

2. The zoom lens system according to claim 1, wherein said positive third lens group comprises a positive lens only, or cemented lens elements having a positive lens element and a negative lens element.

3. The zoom lens system according to claim 1, wherein said zoom lens system satisfies the following condition:

$$0.3<f_{2G}/f_{3G}<0.9$$

wherein $f_{2G}$ designates the focal length of said positive second lens group; and $f_{3G}$ designates the focal length of said positive third lens group.

4. A zoom lens system comprises a negative first lens group, a positive second lens group and a positive third lens group, in this order from an object, wherein upon zooming from the short focal length extremity to the long focal length extremity, all of said negative first lens group, said positive second lens group and said positive third lens groups are arranged to move in the optical axis direction;

wherein said negative first lens group comprises a negative first lens element, a negative second lens element and a positive third lens element, in this order from the object;

wherein said positive second lens group comprises a positive fourth lens element, a positive fifth lens element, a negative sixth lens element, and a positive seventh lens element, in this order from the object;

wherein said positive fifth lens element and said negative sixth lens element are cemented to each other, in this order from the object, and the combined refractive power of said positive fifth lens element and said negative sixth lens element is negative; and wherein said positive fifth lens element and said negative sixth lens element and said positive second lens group satisfy the following condition:

$$0.8<|f_{5-6}|/f_{2G}<1.2$$

wherein $f_{2G}$ designates the focal length of said positive second lens group; and $f_{5-6}$ designates the combined focal length of said positive fifth lens element and said negative sixth lens element which are cemented to each other.

5. The zoom lens system according to claim 4, wherein said positive third lens group comprises a positive lens only, or cemented lens elements having a positive lens element and a negative lens element.

6. The zoom lens system according to claim 4, wherein said zoom lens system satisfies the following condition:

$$0.3<f_{2G}/f_{3G}<0.9$$

wherein $f_{2G}$ designates the focal length of said positive second lens group; and $f_{3G}$ designates the focal length of said positive third lens group.

7. A zoom lens system comprises a negative first lens group, a positive second lens group and a positive third lens group, in this order from the object, wherein upon zooming from the short focal length extremity to the long focal length extremity, all of said negative first lens group, said positive second lens group and said positive third lens groups are arranged to move in the optical axis direction;

wherein said negative first lens group comprises a negative first lens element, a negative second lens element and a positive third lens element, in this order from the object;

wherein said positive second lens group comprises a positive fourth lens element, a positive fifth lens element, a negative sixth lens element, and a positive seventh lens element, in this order from the object; and wherein said positive fourth lens element of said positive second lens group satisfies the following condition:

$$-0.9<(R_{4a}+R_{4b})/(R_{4a}-R_{4b})<-0.5$$

wherein $R_{4a}$ designates the radius of curvature of the object-side surface of the positive fourth lens element of said positive second lens group; and $R_{4b}$ designates the radius of curvature of the image-side surface of the positive fourth lens element of said positive second lens group.

8. The zoom lens system according to claim 7, wherein the combined refractive power of said positive fifth lens element and said negative sixth lens element of said positive second lens group is negative; and wherein said positive fifth lens element and said negative sixth lens element are cemented to each other.

9. The zoom lens system according to claim 7, wherein said positive third lens group comprises a positive lens only, or cemented lens elements having a positive lens element and a negative lens element.

10. The zoom lens system according to claim 7, wherein said zoom lens system satisfies the following condition:

$$0.3<f_{2G}/f_{3G}<0.9$$

wherein $f_{2G}$ designates the focal length of said positive second lens group; and $f_{3G}$ designates the focal length of said positive third lens group.

* * * * *